United States Patent [19]

Fortin

[11] Patent Number: 5,528,753
[45] Date of Patent: Jun. 18, 1996

[54] SYSTEM AND METHOD FOR ENABLING STRIPPED OBJECT SOFTWARE MONITORING IN A COMPUTER SYSTEM

[75] Inventor: Michael R. Fortin, Austin, Tex.

[73] Assignee: International Business Machines Corporation, Armonk, N.Y.

[21] Appl. No.: 269,334

[22] Filed: Jun. 30, 1994

[51] Int. Cl.$^6$ ................................................. G06F 11/00
[52] U.S. Cl. ....................... 395/183.11; 395/183.14; 395/185.06
[58] Field of Search ...................... 395/575, 183.11, 395/183.14, 183.15, 183.13, 184.01, 185.02, 185.06, 183.01, 183.02

[56] References Cited

U.S. PATENT DOCUMENTS

| | | | |
|---|---|---|---|
| 4,866,665 | 9/1989 | Haswell-Smith | 364/900 |
| 5,047,919 | 10/1991 | Sterling et al. | 364/200 |
| 5,193,180 | 3/1993 | Hastings . | |
| 5,313,616 | 5/1994 | Cline et al. | 395/500 |
| 5,335,344 | 8/1994 | Hastings | 395/575 |

OTHER PUBLICATIONS

Bishop, Profiling Under UNIX by Patching, Software Practice and Experience, Oct. 1987, at 729.
Johnson, Profiling for Fun and Profit, USENIX Winter '90 Conference Proceedings, at 325.
Wall, Global Register Allocation at Link Time, Digital Equipment Corporation, WRL Research Report 86/3, Oct. 1986.

*Primary Examiner*—Robert W. Beausoliel, Jr.
*Assistant Examiner*—Alan M. Fisch
*Attorney, Agent, or Firm*—Mark S. Walker

[57] ABSTRACT

A method and system for enabling the monitoring of a target software routine in a stripped object executable on a computer system. The system enables monitor instrumentation of the target routine without access to or recompiling the source code of the object and without access to information required to link with the stripped object. A single demultiplexor entry for each target routine provides access to common instrumentation code and to user specified entry and exit routines for the particular target routine. Common instrumentation code is not replicated when used to monitor a number of software programs. User specified entry and exit routines are used to collect selected performance and system state data. Common instrumentation code is provided to link the target routines to the user specified entry and exit routines. The standard link interface allows the entry and exit routines to be written in high level languages.

5 Claims, 5 Drawing Sheets

FIG. 6A

| Instruction Addresses | Instructions or Data | Symbolic Representation of Instructions | | | |
|---|---|---|---|---|---|
| 0x100003b0 | 10000200 | N/A | | | Address of Target Routine, 0x10000200 |
| 0x100003b4 | 1000025a | N/A | | Data Section ⎱602 | Name in Traceback Tbl., 0x1000025a |
| 0x100003b8 | 7c0802a6 | mflr | r0 | Return to Target Section ⎱604 | Saved 1st Instruction of Target Routine |
| 0x100003bc | 4bfffe48 | b | 0x10000204 | | Branch to 2nd Instruction of Target |
| 0x100003c0 | bc01ff80 | stm | r0, -128(r1) | | Save All Registers |
| 0x100003c4 | 81820000 | l | r12, 0x0 (r2) | | Load r12 with Data Begin Address |
| 0x100003c8 | 3da00000 | liu | r13, 0x0 | | Compute Offset Address for Common |
| 0x100003cc | 61ad101c | oril | r13, r13, 0x101c | | Exit Code and Store in r13 |
| 0x100003d0 | 3dc00000 | liu | r14, 0x0 | | Compute Offset Address for Exit |
| 0x100003d4 | 61ce1034 | oril | r14, r14, 0x1034 | | Instrumentation Routine in r14 |
| 0x100003d8 | 7dad6014 | a | r13, r13, r12 | Exit Section ⎱606 | Add Data Begin Address |
| 0x100003dc | 7dce6014 | a | r14, r14, r12 | | Add Data Begin Address |
| 0x100003e0 | 81ad0000 | l | r13, 0x0 (r13) | | Value at r13 contains TOC Entry |
| 0x100003e4 | 81ce0000 | l | r14, 0x0 (r14) | | Value at r14 contains TOC Entry |
| 0x100003e8 | 800d0000 | l | r0, 0x0 (r13) | | Get Common Exit Code Addr. from TOC |
| 0x100003ec | 804d0004 | l | r2, 0x4 (r13) | | Get TOC Pointer for Instr. Library |
| 0x100003f0 | 7c0903a6 | mtctr | r0 | | Place Addr. of Common Exit in Cnt. Reg. |
| 0x100003f4 | 800e0000 | l | r0, 0x0 (r14) | | Get Instrumentation Exit Routine Addr. |
| 0x100003f8 | 4e800420 | bctr | | | Branch to Common Exit Code. |

Four Sections of a Demux-Entry

FIG. 6B

| | | | | |
|---|---|---|---|---|
| 0x100003fc | 3c001000 | liu | r0, 0x1000 | Load r0 with Addr. of Demux-Entry (In this case 0x100003b0) |
| 0x10000400 | 600003b0 | oril | r0, r0, 0x3b0 | |
| 0x10000404 | bc01ff80 | stm | r0, -128(r1) | Save All Registers |
| 0x10000408 | 81820000 | 1 | r12, 0x0 (r2) | Load r12 with Data Begin Address |
| 0x1000040c | 3da00000 | liu | r13, 0x0 | Compute Offset Address for Common Entry Code and Store in r13 |
| 0x10000410 | 61ad1018 | oril | r13, r13, 0x1018 | |
| 0x10000414 | 3dc00000 | liu | r14, 0x0 | Compute Offset Address for Entry Instrumentation Routine in r14 |
| 0x10000418 | 61ce1030 | oril | r14, r14, 0x1030 | |
| 0x1000041c | 7dad6014 | a | r13, r13, r12 | Add Data Begin Address |
| 0x10000420 | 7dce6014 | a | r14, r14, r12 | Add Data Begin Address |
| 0x10000424 | 81ad0000 | 1 | r13, 0x0 (r13) | Value at r13 contains TOC Entry |
| 0x10000428 | 81ce0000 | 1 | r14, 0x0 (r14) | Value at r14 contains TOC Entry |
| 0x1000042c | 800d0000 | 1 | r0, 0x0 (r13) | Get Common Entry Code Addr. from TOC |
| 0x10000430 | 804d0004 | 1 | r2, 0x4 (r13) | Get TOC Pointer for Instr. Library |
| 0x10000434 | 7c0903a6 | mtctr | r0 | Place Addr. of Common Entry in Cnt. Reg. |
| 0x10000438 | 800e0000 | 1 | r0, 0x0 (r14) | Get Instrumentation Entry Routine Addr. |
| 0x1000043c | 4e800420 | bctr | | Branch to Common Entry Code. |

608 Entry Section

SYSTEM AND METHOD FOR ENABLING STRIPPED OBJECT SOFTWARE MONITORING IN A COMPUTER SYSTEM

RELATED APPLICATIONS

The present invention is related to application Ser. No. 08/161,966 filed Dec. 3, 1993 having the title "System and Method for Enabling Software Monitoring in a Computer System" and application Ser. No. 08/161,967 filed Dec. 3, 1993 having the title "System and Method for Enabling Shared Library Software Monitoring in a Computer System."

BACKGROUND OF THE INVENTION

1. Field of the Invention

The present invention relates generally to measuring the performance of computer systems. More particularly, it relates to the introduction of system monitoring routines to stripped object code software operating on a computer system. Still more particularly, the present invention relates to computer implemented methods and computer apparatus for enabling a computer system to collect information during the execution of software on that computer system without recompiling that software.

2. Background and Related Art

Computer system performance, e.g. the speed of operation or the throughput of a system, is a function of the computer system hardware and the efficiency of the software used on the system. Performance can be enhanced by ensuring that the software is efficiently written to most effectively use the hardware or by modifying the hardware to enhance certain software function.

The identification of performance problems requires an ability to monitor the execution of software on a particular hardware system and to be able to identify those sections of the software that are consuming inordinate amounts of hardware resource. For example, the execution of a software program can be monitored to determine how much processing time is spent in each subroutine.

Tracing program execution and monitoring execution adds significant overhead to program execution. Thus, most software does not include monitoring function in its basic form. Software developers may add instructions to the software to monitor selected portions, but these instructions are typically removed before the final version is shipped to customers or placed in regular use.

Introduction of an existing program onto new hardware or perception of performance problems in new software may create a requirement to monitor software that does not contain any inherent monitoring capability. This creates a need to "instrument" the software to measure performance. Instrumentation of software refers to the process of enabling the software to be monitored at selected points to capture significant system state data at those points.

Historically, instrumentation of software was accomplished by modifying the source code for the software to include monitoring instructions, recompiling the source code, and then executing the modified software. The approach has the disadvantages of requiring access to source code (which may not be available for commercially purchased software), and being error prone if the person modifies the code incorrectly. In addition, this form of instrumentation may introduce performance problems itself causing the results to be misleading.

A second approach to instrumentation uses special purpose hardware to record access to certain computer system functions. A special monitor is connected to the computer to record changes in the physical state of the machine, e.g. when a signal is received on a certain line or when certain memory addresses are accessed. This approach has the disadvantage of requiring the special purpose hardware. It is also limited to those functions that cause a recognizable physical change to the hardware. The approach is costly and not generally applicable.

Yet another approach has been suggested in U.S. Pat. No. 5,193,180 to Hastings. Hastings seeks to monitor memory access by expanding the program code to include specific monitoring instructions. Hastings avoids the need for source code by expanding relocatable binary files. However, the files to be expanded must have a full symbol table available because of the movement of relative locations due to the expansion. The technique is also not applicable to situations where the symbol table has been stripped from an executable object to save storage space. Finally, Hastings cannot be applied to an object already loaded into memory for execution due to the need to recalculate relative addresses.

Still another approach is suggested in commonly assigned application Ser. No. 07/662,521, bearing Attorney Docket Number AT991-001 entitled "System and Method for Computer System Profiling." This method is non-invasive and does not require modifying the code being monitored. The system and method are implemented in a software program that samples instruction addresses to be executed by the system. Summarization of the number of times an address is referenced and correlation to the source code causing generation of that instruction provides statistics on the time the program spends in certain sections of code. This approach has the disadvantage of being limited to estimating time spent in code sections and not allowing collection of other system state information. It also requires the source code to be available to generate an assembly listing for address to code correlation.

Monitoring of commercially distributed products can be even more difficult when those products are distributed as "stripped objects." A stripped object is the executable form of a program or system from which all non-essential information has been removed. The symbol table and related information is eliminated. Stripping significantly reduces the size of the executable file thereby improving disk storage efficiency for those programs. However, stripping makes instrumentation of program code more complex because techniques dependent upon linking the instrumentation code with the monitored code cannot be used. Linked instrumentation code is discussed in the above referenced related cases.

A technical problem therefore exists to provide a means of instrumenting a stripped object program for user defined performance monitoring without access to the program source code and without requiring special purpose hardware monitors.

SUMMARY OF THE INVENTION

The present invention is directed to providing a system and method for enabling monitoring of stripped object program performance without requiring access to the program source code.

The present invention is directed to a method for monitoring a plurality of software programs executable on a computer system, the software programs each have a plurality of computer executable instructions, the software programs being stripped of linkable information, the computer system having memory and a processor, the method comprising the steps of:

storing a plurality of monitoring programs for monitoring software execution;

selecting one or more of the plurality of software programs for monitoring;

expanding each of the selected software programs to include an addressable entry for each of the monitoring programs and a demultiplexor entry for each of the selected software programs associating the software program with an appropriate one or more of the monitoring routines;

copying a first of the executable instructions to a first addressable location; and replacing the first executable instruction with a branch to the demultiplexor entry for the software program.

It is therefore an object of the invention to provide a system and method for efficiently instrumenting stripped object routines executing on a computer system.

It is yet another objective to provide a system and method that enables instrumenting of stripped objects without requiring access to the source code for those objects and without recompilation.

It is yet another objective of the invention to provide a system and method for instrumenting stripped objects after those objects have been loaded for execution in a computer system.

The foregoing and other objects, features and advantages of the invention will be apparent from the following more particular description of a preferred embodiment of the invention, as illustrated in the accompanying drawing wherein like reference numbers represent like parts of the invention.

BRIEF DESCRIPTION OF THE DRAWING

FIG. 6 is an illustration of the demultiplexor entry layout according to the present invention.

DETAILED DESCRIPTION

The preferred embodiment of the present invention operates on a computer system having a processing unit, system memory and various input/output and other peripheral devices. The preferred embodiment operates on and IBM RISC System/6000 computer running the AIX operating system. (IBM, RISC System/6000, and AIX are trademarks of the IBM Corporation.) It will be understood, however, that the invention can be implemented on other hardware platforms and on other operating systems.

Figure 1:
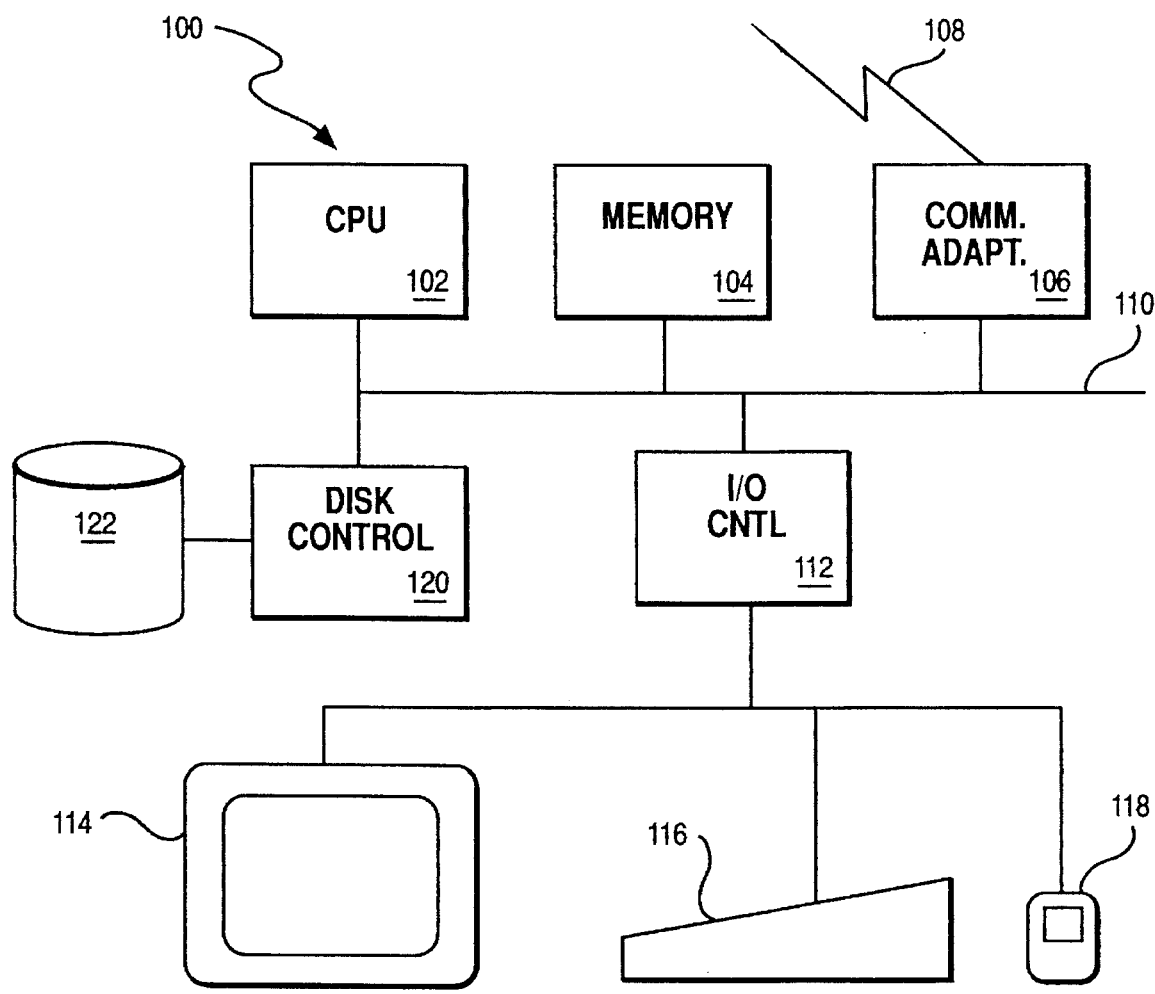
FIG. 1 is a block diagram illustrating a computer system on which the preferred embodiment of the present invention operates.

The preferred embodiment is implemented with a computer system having the components shown generally for the system 100 in FIG. 1. Processing is provided by central processing unit or CPU 102. CPU 102 acts on instruction and data stored in random access memory 104. Long term storage is provided on one or more disks 122 operated by disk controller 120. A variety of other storage media could be employed including tape, CD-ROM, or WORM drives. Removable storage media may also be provided to store data or computer process instructions. Operators communicate with the system through I/O devices controlled by I/O controller 112. Display 114 presents data to the operator while keyboard 114 and pointing device 118 allow the operator to direct the computer system. Communications adapter 106 controls communications between this processing unit and others on a network to which it connected by network interface 108.

Instrumentation of software leads to the monitoring of a "target routine", i.e. that portion of the software for which data is to be collected. The target routine can be a complete program, a subroutine of a program, or a routine from a routine library. Also of interest in the present invention are routines that form the basis of an operating system, the "kernel" routines. The kernel is often provided as stripped objects. Analysis of kernel routine performance is often crucial to tuning a computer system for optimum performance. The present invention applies, however, to any stripped objects, not just kernel objects.

Figure 2:
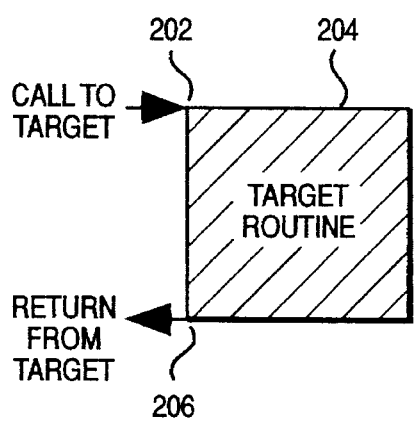
FIG. 2 is a flow diagram illustrating the normal flow of control to and from a routine.

Each target routine has one or more entry points and one or more exit points. A target routine is invoked or called by a previous routine. The processor will transfer control to the target routine entry point. Instructions from the target routine will be executed until an exit back to the calling routine is encountered. The target routine instructions may include an invocation of another subroutine. In some cases, control will transfer to another routine and will never be returned to the calling routine. The flow of control is illustrated in FIG. 2. In FIG. 2 the "Call to Target" transfers control to the instruction at address 202. Target routine instructions 204 are executed until control is returned to the calling program at 206.

Figure 3:
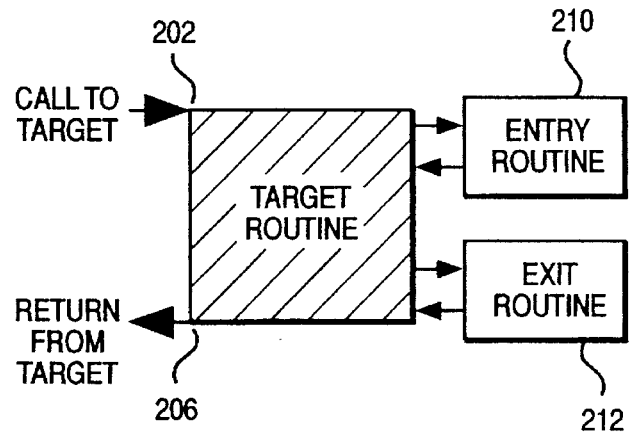
FIG. 3 is a flow diagram illustrating the flow of control in an instrumented routine according to the present invention.

Enabling routine monitoring allows system state information to be collected at entry to the target routine and at exit from the routine. Entry and Exit monitoring provide statistics on how much time is spent in any routine and an ability to determine what changes to the system are caused by that routine. The logical flow of control after instrumentation according to the present invention is shown in FIG. 3. The Call to Target still points to address 202. After 202, however, control is passed to Entry Routine 210. Entry Routine 210 collects the information desired by the monitor and returns control to the target routine. Upon Exit from the Target Routine, control is passed to an Exit Routine 212 that collects additional data.

The present invention permits the Entry and Exit Routines to be written in a high level language such as C thereby making monitoring easier for the average programmer. This flexibility allows the programmer to collect precisely the information needed without introducing a great deal of complexity into the monitoring process. Within the Entry and Exit routines, the programmer can direct the system to send data to a printer, to a file, to the console, or to a shared memory segment. The routines also allow the function of a target routine to be fully replaced such that newly provided code will be executed instead of the base code in the routine being monitored.

Figure 4:
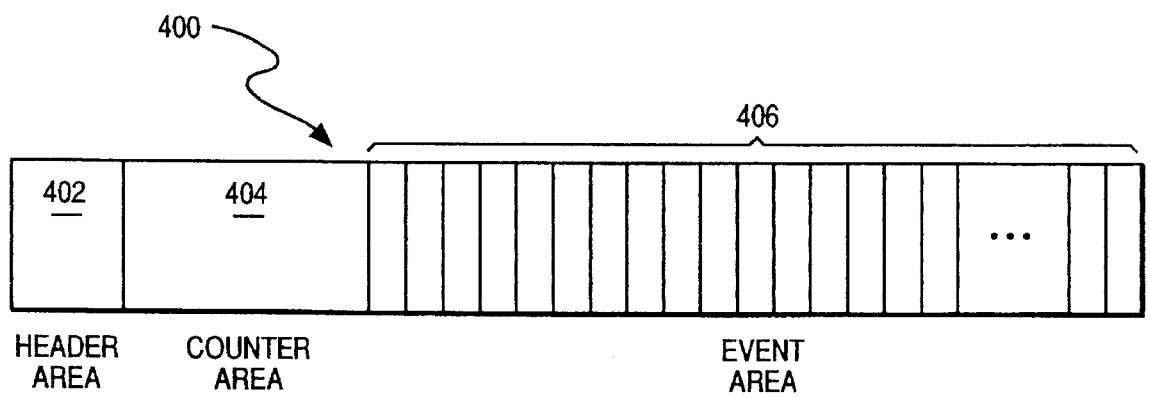
FIG. 4 is a diagram illustrating the layout of a shared memory segment used for recording data in the present invention.

An example of a shared memory segment for collecting monitor events is shown in FIG. 4. The shared memory segment 400 is an allocated area in the system memory that is defined as accessible to multiple processes. The segment preferably includes a header area 402, a counter area 404 for recording counts of selected events, and a event area 406 for recording a number of monitor events. The size of the memory segment is alterable based on the user requirements. The size allocated determines the total number of monitor events that can be captured in event area 406. Although this shared segment structure is preferred, other structures can be used within the scope of the invention.

The system and method of the present invention enable software monitoring by instrumenting the target routines selected by the user. The system and method perform the necessary target routine modifications thereby eliminating potential errors caused by incorrect manual modifications.

Stripped executable modules cannot be linked with the instrumentation code and cannot use the approaches discussed in the above mentioned related applications.

Figure 5:
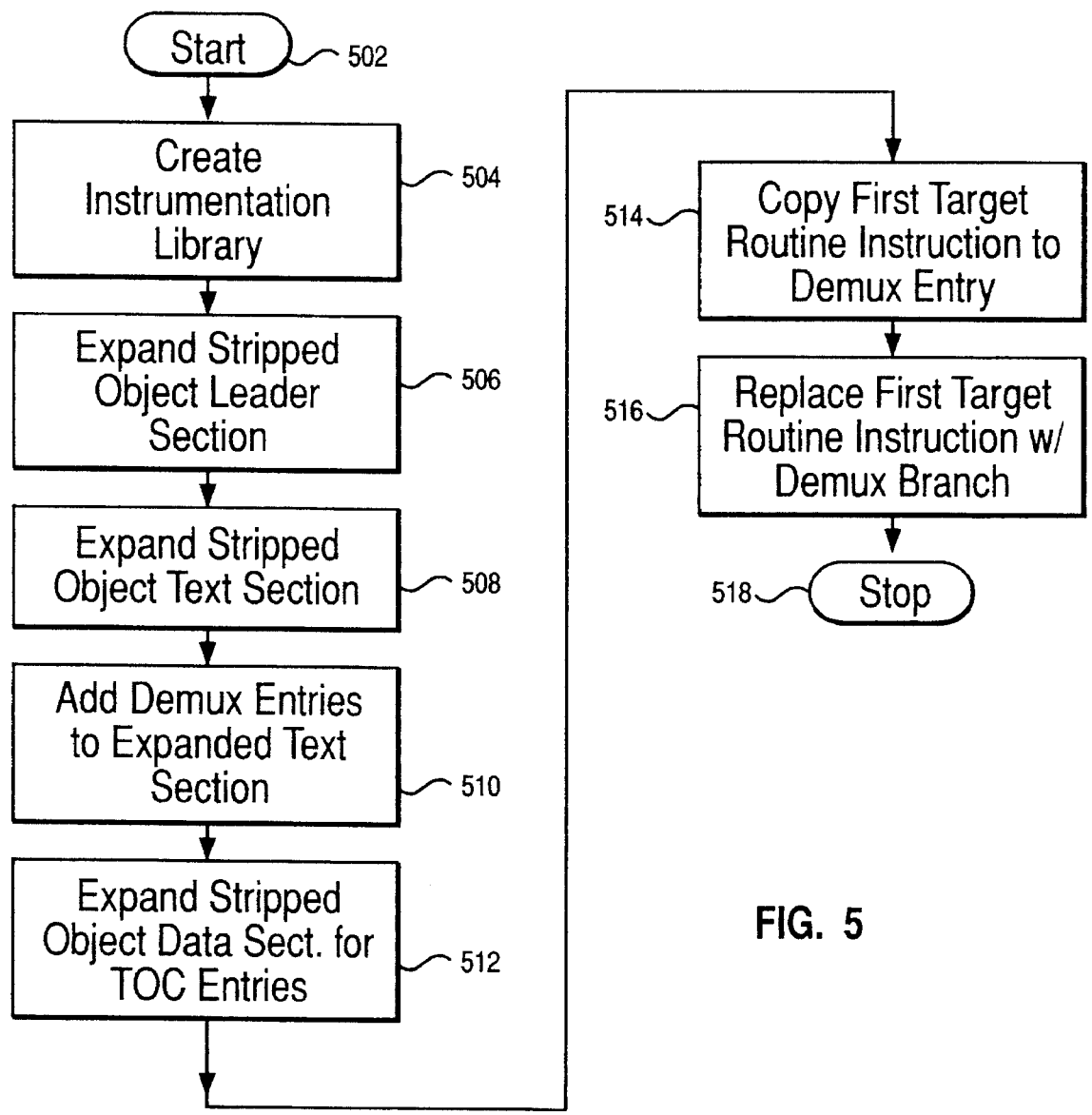
FIG. 5 is a flowchart depicting the steps of the instrumentation process according to the present invention.

Instrumentation of stripped objects will be described with reference to FIG. 5. The instrumenting process starts at 502 and immediately proceeds to the creation of an instrumentation library 504. The instrumentation library contains common instrumentation code and the user provided entry and exit routines. Once the library is created the stripped objects must be modified to allow access to the instrumentation library. The lack of a symbol table for the stripped objects means that the instrumentation library cannot simply be linked with the objects. Another approach is required.

The preferred embodiment of the present invention instruments programs written in the C programming language and stored in the XCOFF executable format. The process of the present invention is applicable, however, to other languages and to other executable formats such as ELF. The changes required to adapt the following process to such environments are known to those in the data processing art.

First, the loader section of the stripped object is expanded 506. The expansion enables the addition of the instrumentation library to the list of dependencies for the stripped object. The dependency is added by updating the loader section's symbol and string tables as well as the loader section's relocation and import regions. As a result the system loader will be forced to load the instrumentation library prior to executing the first instruction of the stripped object.

Next, the text section of the stripped object is expanded 508 to allow for the insertion of the demultiplexor entries 510. A demultiplexor entry (demux-entry) is provided for each target routine. The demultiplexor entry serves to direct an instrumentation call to the appropriate common and user specific entry and exit routines. The demultiplexor of the present invention is similar to an electrical multiplexor because is selects a single entry and a single exit routine from a number of available routines based on the signal input values. The demux-entry contain instructions and data that link the target routine to the associated entry and exit instrumentation routines. Each demux-entry consists of four sections:

1. a data section;
2. a "Return to Target Routine" section;
3. an Exit section; and
4. an Entry section.

An example demux-entry is shown in FIG. 6. The data section 602 contains the addresses at which the target routine and the target routine's symbolic name reside within the text segment of the stripped object.

The "Return to Target Routine" section 604 contains the "saved" first instruction of the target routine and a direct branch back to the address of the second instruction of the target routine. This section ensures that all target routine instructions are executed in the proper order.

The Entry section 608 loads register r0 with the address of the demux-entry; saves all registers; and calculates the address of the common Entry code and the user supplied Entry instrumentation routine. Both the common Entry code and the Entry instrumentation code reside in the shared library and their addresses can be ascertained only by reference to the stripped object Table of Contents (TOC). The Entry section concludes by branching to the common Entry code via the count register that has been loaded with the address of the common Entry code. Immediately before the branch, register r0 is loaded with the address of the user supplied Entry instrumentation routine. The common Entry code will use r0 to branch to the Entry instrumentation routine.

Exit section 606 is very similar in structure to the Entry section with the difference that the common Exit code and the Exit instrumentation code are executed.

The preferred embodiment of the demux-entry contains only thirty-four (34) instructions and two integer data items. In the preferred embodiment which requires four bytes of storage for each integer, the total spatial cost to instrument each routine is 144 bytes. The majority of instrumentation code is provided as common code in a single shared copy. Thus, a large number of routines can be instrumented with only a small incremental increase in storage requirements.

Next, the stripped object data section is expanded 512 to include additional table of contents (TOC) entries for the instrumentation library. The TOC entries will include addresses for the Entry and Exit instrumentation routines making them addressable by the demux-entries.

The first instruction of the target routine is copied 514 to a specified location in the demux-entry. The first instruction is replaced with a branch to the Entry section of the associated demux-entry. This copy and replace is the only modification required to the target routine.

Instrumentation is now complete. The process above has been described in the preferred order, however, the sequence of the process steps can be varied significantly without departing from the spirit of the present invention.

Figure 7:
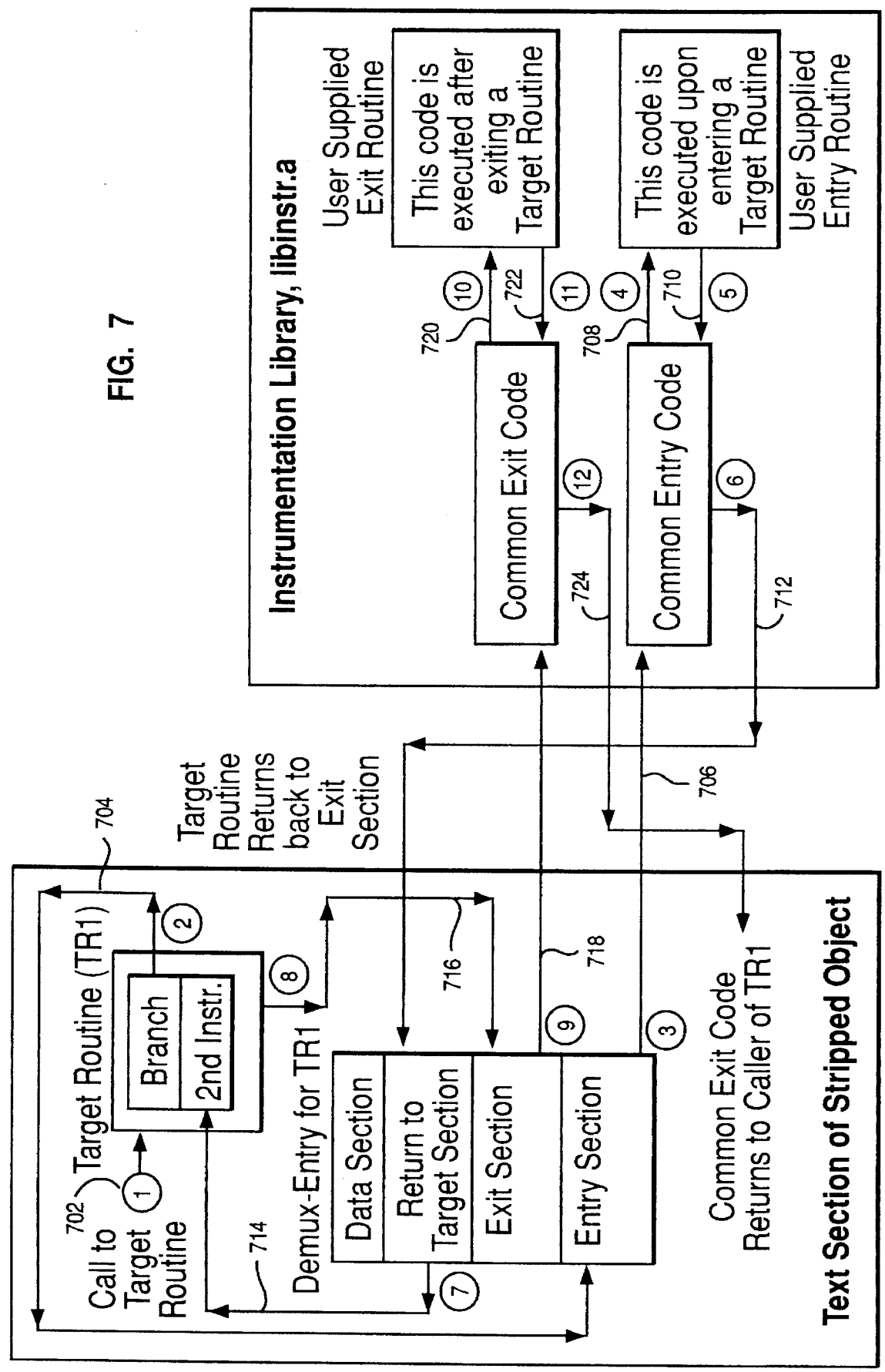
FIG. 7 is a diagram illustrating the detailed flow of execution in a system according to the present invention.

The operation of the instrumented system according to the present invention will be described with reference to FIG. 7. Processing begins with a call to the target routine 702. This call will encounter the branch first instruction and immediately branch to the Entry section 704. The Entry routine saves the link register on the stack, saves the registers on the stack and calls 706 the common Entry code that in turn calls 708 user supplied Entry routine. The Entry routine can examine the stack, print a message, call trace, or perform other tasks. After returning from the Entry instrumentation routine 710 and common Entry code 712, the registers are restored and the link register is set to point to a specific offset in the demux-entry. The stored target routine first instruction is executed in the "Return to Target" section and control branches to the second instruction of the target routine 714.

Upon completion of the target routine, control is returned 716 to the demux-entry rather than the original calling routine. The demux-entry code saves the registers and calls 718 the common Exit code and calls 720 the user supplied Exit instrumentation routine with the return value from the target routine as a parameter. When the exit routine returns 722, the registers are restored, the link register is restored, and a return 724 is made to the original caller of the target routine.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

I claim:

1. A method for monitoring a plurality of software programs executable on a computer system, said software programs each having a plurality of computer executable instructions, said software programs being stripped of linkable information, the computer system having memory and a processor, the method comprising the steps of:

storing a plurality of monitoring programs for monitoring software execution said plurality of monitoring programs include common monitoring programs common to all of said software programs and entry/exit monitoring programs for performing monitoring actions for selected one or more of said software programs;

selecting one or more of said plurality of software programs for monitoring;

expanding each of said selected software programs to include an addressable entry for each of said monitoring programs and a demultiplexor entry for each of said selected software programs associating said software program with an appropriate one or more of said monitoring routines the expanding including the steps of:

determining a common routine address for said common monitoring program;

receiving an instrument routine address for said entry/exit monitoring programs for each of said software programs;

storing said common routine address and said instrument routine address in said demultiplexor entry;

copying a first of said executable instructions to a first addressable location; and replacing said first executable instruction with a branch to the demultiplexor entry for said software program.

2. The method of claim 1, wherein the common monitoring programs include entry monitoring programs and exit monitoring programs and wherein the determining step includes the steps of:

determining an entry common routine address for said common monitoring program;

determining an exit common routine address for said common monitoring program;

and wherein said receiving step receives an entry instrument routine address and an exit routine address; and wherein the storing step stores the entry and exit common routine addresses and the entry and exit instrumentation routine addresses in said demultiplexor entry.

3. A system for monitoring execution of a plurality of stripped object software routines on a computer system, the system comprising:

means for storing a plurality of monitoring programs at addressable locations in a storage means;

means for modifying a first instruction of each of said stripped object software routines to address one or more of said plurality of monitoring programs upon entry to said software routine and upon exit from said software routines said means for modifying including:

means for adding table of contents entries for said monitoring programs to said stripped object software routines;

means for adding demultiplexor entries associating one or more of said monitoring programs with each of said plurality of software routines;

means for selecting one or more of said software routines for monitoring;

means for inserting a branch to said added demultiplexor entry as a first instruction in each of said selected software routines;

means for saving said first instruction of said selected software routines in said demultiplexor entry.

4. The system of claim 3, wherein said monitoring programs include common monitoring code common to all of said plurality of software routines and instrumentation monitoring code unique to certain ones of said software routines, and further comprising:

means for directing execution to said common monitoring code; and means for directing execution to said instrumentation code associated with each of the selected software routines.

5. The system of claim 3, further comprising:

means for collecting data generated by said monitoring programs.

* * * * *